M. McC. SHAW.
RAIL JOINT.
APPLICATION FILED FEB. 10, 1913.

1,076,917.

Patented Oct. 28, 1913

4 SHEETS—SHEET 1.

WITNESSES
M. P. McKee
R. Kishick

INVENTOR
By M. M. Shaw
Alex. J. Wedderburn Jr., Attorney

M. McC. SHAW.
RAIL JOINT.
APPLICATION FILED FEB. 10, 1913.
1,076,917.
Patented Oct. 28, 1913.
4 SHEETS—SHEET 2.
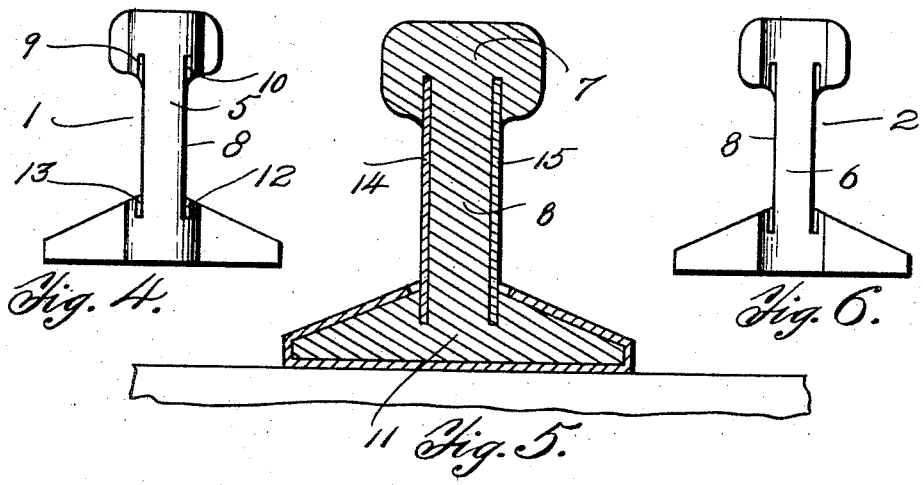
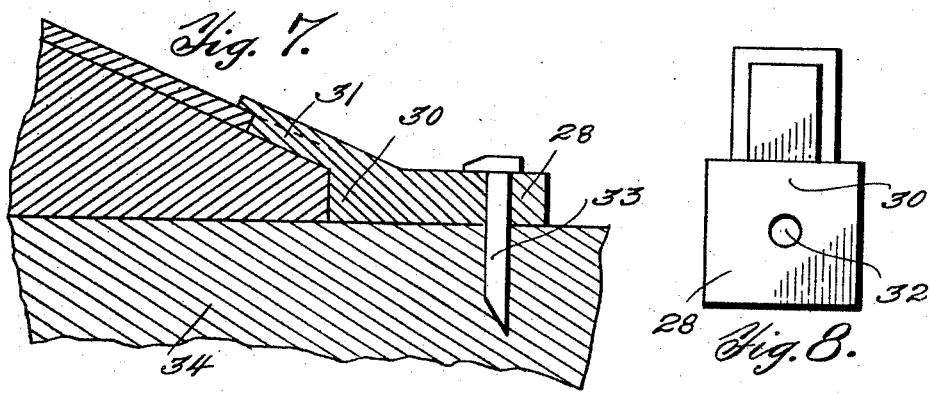
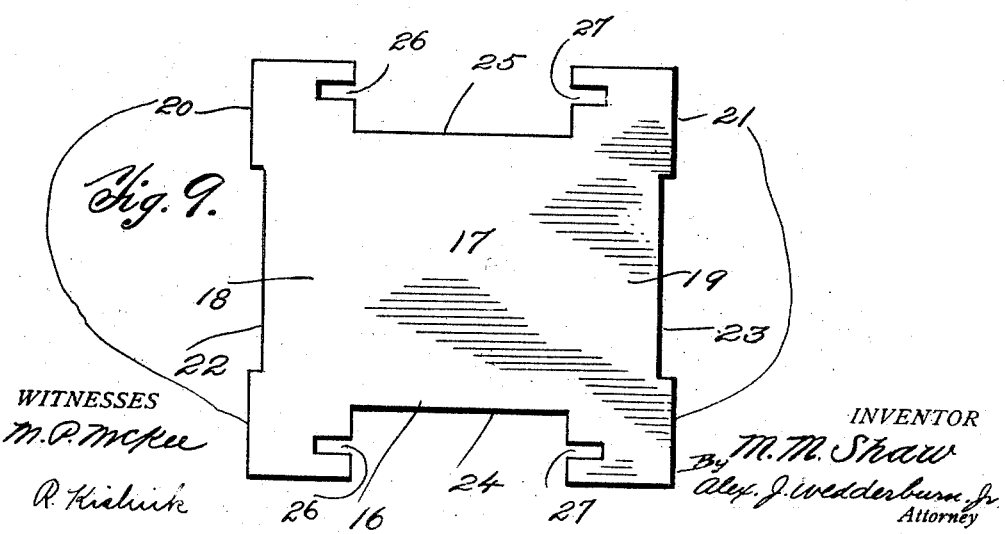
WITNESSES
M. P. McKee
R. Kistink
INVENTOR
M. M. Shaw
By Alex. J. Wedderburn Jr.
Attorney

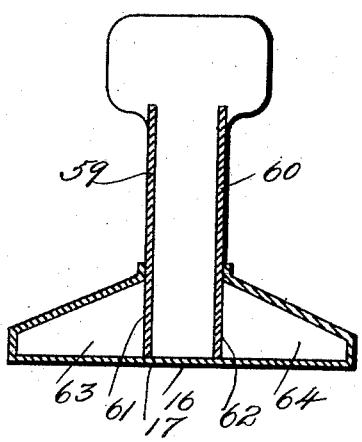
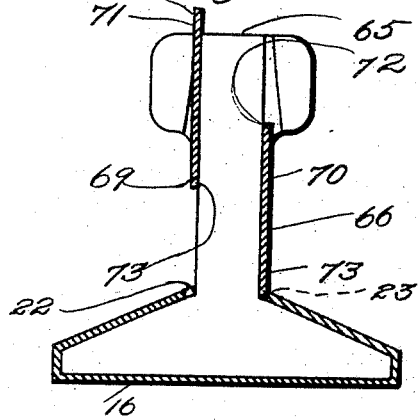
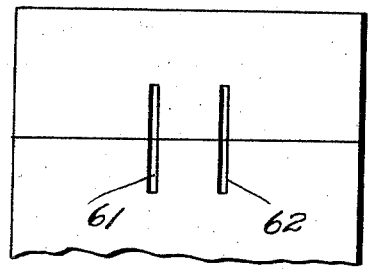
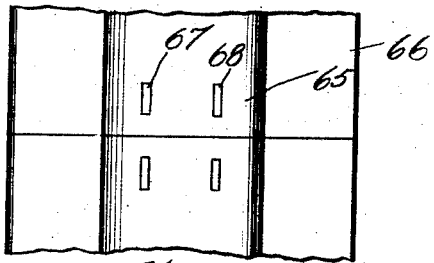
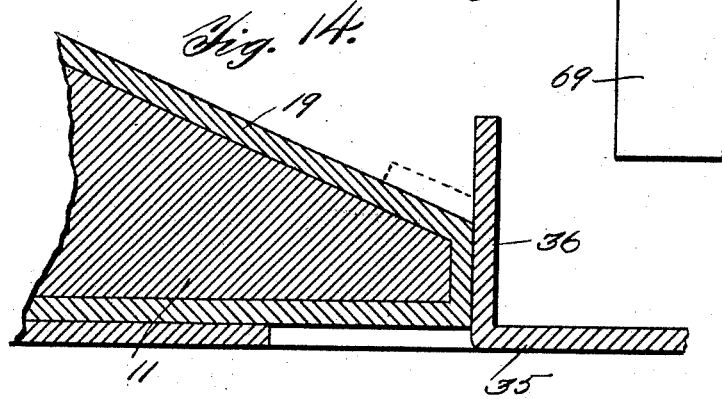

M. McC. SHAW.
RAIL JOINT.
APPLICATION FILED FEB. 10, 1913.
1,076,917.
Patented Oct. 28, 1913.
4 SHEETS—SHEET 4.
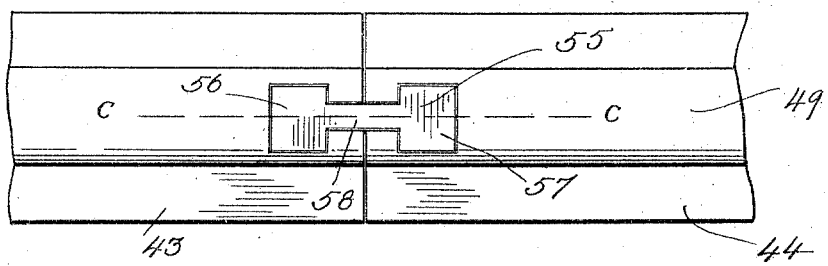
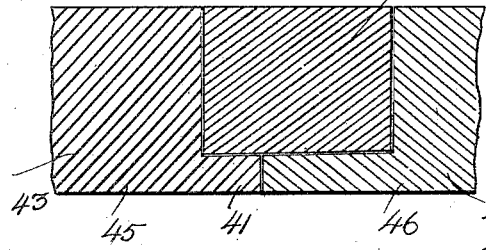
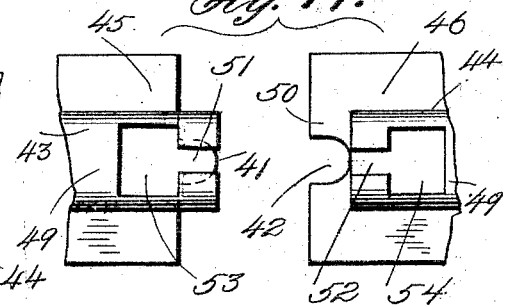
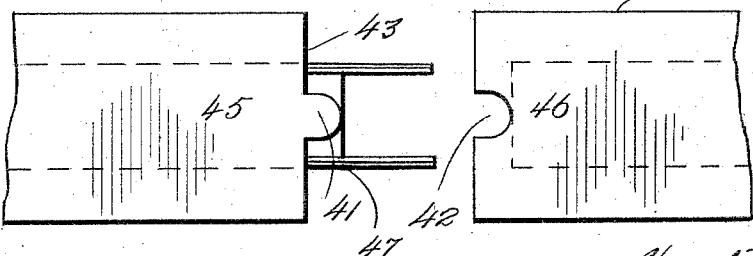
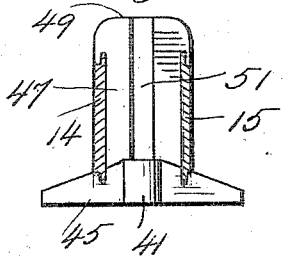
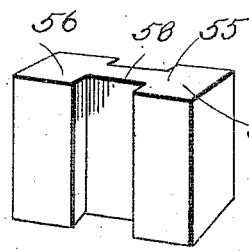
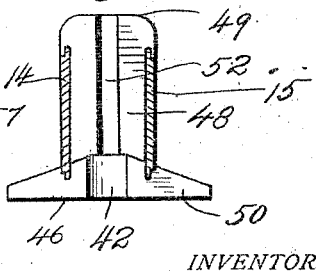
WITNESSES
M. P. McKee
R. Kislink
INVENTOR
M. M. Shaw
BY Alex. J. Wedderburn, Jr.
Attorney ively reading.

UNITED STATES PATENT OFFICE.

MOSES McCORMICK SHAW, OF BRADDOCK, PENNSYLVANIA.

RAIL-JOINT.

1,076,917.  Specification of Letters Patent.  Patented Oct. 28, 1913.

Application filed February 10, 1913. Serial No. 747,333.

*To all whom it may concern:*

Be it known that I, MOSES M. SHAW, a citizen of the United States, residing at Braddock, in the county of Allegheny and State of Pennsylvania, have invented certain new and useful Improvements in Rail-Joints, of which the following is a specification.

This invention relates to improvements in rail joints and has for its object to provide means whereby two abutting ends of rails may be joined together without the use of bolts and nuts as is necessary with the common form of fish plate at present in use.

Another object of the invention is to provide means whereby rails may be very quickly joined or disjoined.

Another object of the invention is to provide a sliding connection between a pair of abutting rail ends.

With the above and other objects in view I have invented the device illustrated in the accompanying drawings in which—

Figure 1:
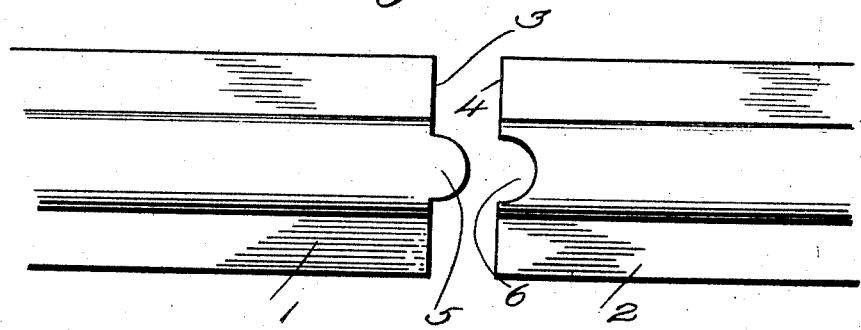
Figure 2:
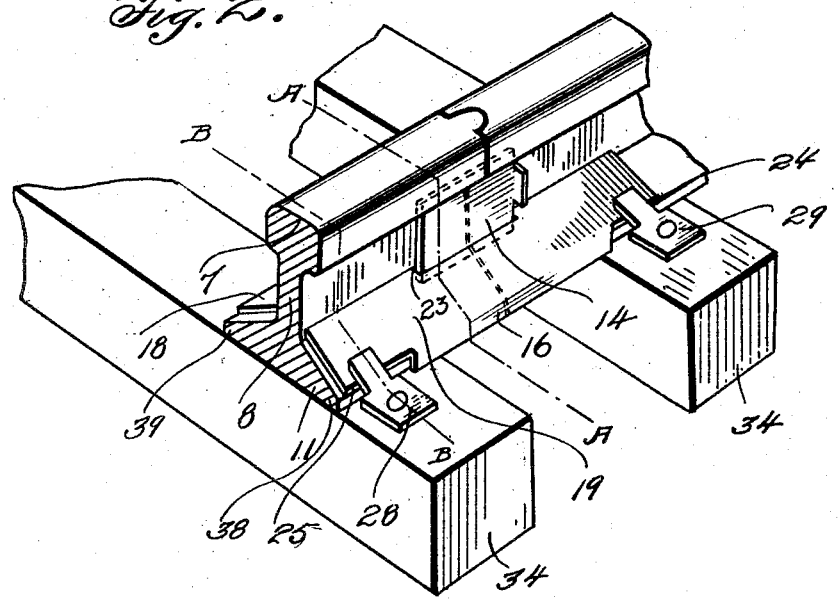
Figure 3:
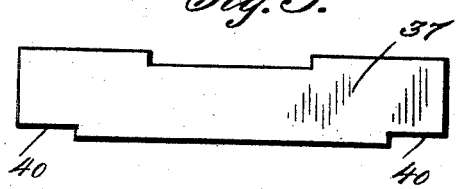

Figure 1 is a top plan view of a pair of rail ends, Fig. 2 is a perspective view of a rail joining device connecting rail ends, Fig. 3 is a plan view of a key member, Fig. 4 is an end view of a rail, Fig. 5 is a section taken on line A—A of Fig. 2, Fig. 6 is a view of the end of a rail opposing that shown in Fig. 4, Fig. 7 is an enlarged detail sectional view taken on line B—B of Fig. 2, Fig. 8 is a detail bottom plan view of a fixing member, Fig. 9 is a plan view of a shoe before being shaped to fit a rail, Fig. 10 is a vertical sectional view of a modified form of rail joint, Fig. 11 is a similar view of another modification, Fig. 12 is a bottom plan view of the rail end shown in Fig. 10, Fig. 13 is a top plan view of the rail end shown in Fig. 11, Fig. 13ᵃ is an elevational view of a joint member, Fig. 14 is a view similar to Fig. 7 showing a steel tie having a struck up fixing member, Fig. 15 is a top plan view of rail showing another modification of a rail joint, Fig. 16 is a section taken on line C—C of Fig. 15, Fig. 17 is a top plan view of a pair of rail ends slightly separated, Fig. 18 is a bottom plan view of the rail ends shown in Fig. 17, Fig. 19 is an end view of one of the rails shown in Fig. 15, Fig. 20 is a detail perspective view of a rail joining member, and Fig. 21 is a view of the opposing end of the rail shown in Fig. 19.

Like reference characters indicate like parts throughout the specification and in the various views in the drawings, in which—

1 and 2 are rails having abutting ends 3 and 4, the end 3 of the rail having a vertical tongue 5 and the end 4 having an opposing vertical groove 6 to receive said tongue. Under the tread 7 on the opposing sides of the web 8 are a pair of horizontal grooves 9 and 10 and over the base 11 alining with the grooves 9 and 10 are horizontal grooves 12 and 13 on each end of the rail whereby slideways are formed for the sliding joint members 14 and 15 which are slid into said grooves on either one of the other of the rails 1 and 2 before they are joined and afterward slid to the position straddling the two rail ends as shown in Fig. 2. Also fitting over the base of one of the rail ends before the rails are joined is a shoe 16 having a base 17 and a pair of opposing returned flanges 18 and 19, the edges 20 and 21 of which are provided with cut away portions 22 and 23 adapted to embrace the joint members 14 and 15 and hold them in fixed position straddling said rail ends. The shoe base 17 has cut away portions 24 and 25 so as to provide recesses 26 and 27 to receive the fixing members 28 and 29 which are provided with rectangular portions 30 adapted to project into said recesses and hold the shoe 16 against movement. The members 28 are also provided with angularly disposed flanges 31 adapted to seat over the parts 18 and 19, and an opening 32 to receive the spikes 33 whereby they are held fixed to wooden ties 34.

In case metal ties 35 are used they are provided with struck up portions 36 which are adapted to be bent down over the shoe 16 after it has been fixed in its proper place as clearly shown in Fig. 14.

Instead of the shoe 16 a key 37 may be used on the flanges 38 and 39 of the base 11. This key may be held in place by ordinary rail spikes projecting into the recesses 40 in said key 37.

In Figs. 10 and 12 I show a modification of my rail joint in which the sliding members 59 and 60 are pushed up through the slots 61 and 62 in the flanges 63 and 64 before the shoe 16 is slid into place. The base 17 of the shoe holds the members 59 and 60 in place.

In Figs. 11 and 13 is shown still another slight modification in which the tread 65 of the rail 66 is provided with opposing slots 67 and 68 through which the projecting ends 71 and 72 of the joint members 69 and 70 are projected, and held in the raised position shown at E until the member 16 is slid into place after which the ends 73 of the members 69 and 70 are allowed to drop into the recesses 22 and 23 whereby said members are held in place.

In Figs. 15 to 21 I show a slight modification of the device in that the tongue 41 and groove 42 in the rails 43 and 44 extend only the thickness of the base portions 45 and 46, and the body portions 47 and 48 of the ends of the rails are nearly as wide as the treads 49 thereof, and the body portion 47 of the rail 43 projects beyond the base 45 thereof and is adapted to seat on the projecting end 50 of the base 46. And vertical slots 51 and 52 extend inwardly the entire depth of said body portions to the enlarged recesses 53 and 54, so that when the rail ends are brought together a single recess having enlarged ends is formed to receive the key, or locking member 55 which is formed with enlarged heads 56 and 57 connected by a web 58 so that when it is slipped into said recess formed by the abutting rail ends it, together with the members 14 and 15 will securely hold said ends together. The heads 56 and 57 may be made slightly shorter than the length of the recesses 53 and 54 whereby a sufficient play will be permitted for expansion and contraction.

Having now described my invention that which I claim to be new and desire to procure by Letters Patent is:—

1. The described device consisting of a pair of rails, a chair adapted to fit the base of said rails, sliding joint members connecting said rails, said chair adapted to receive the lower ends of said joint members, in recesses formed in said chair.

2. The described device consisting of a pair of rails having tongue and groove connections, sliding joint members connecting said rails, a chair adapted to fit the base of said rails and adapted to slide into position to connect the ends thereof, said chair adapted to receive the lower ends of said joint members.

3. The described device consisting of a pair of rails having tongue and groove connections, sliding joint members connecting said rails, a chair adapted to fit the base of said rails and adapted to slide into position to connect the ends thereof, said chair adapted to receive the lower ends of said joint members, recesses formed in said chair to receive said lower ends.

4. The described device consisting of a pair of rails having tongue and groove connections, sliding joint members connecting said rails, a chair adapted to fit the base of said rails and adapted to slide into position to connect the ends thereof, said chair adapted to receive the lower ends of said joint members, recesses formed in said chair to receive said lower ends, said rails having slots with enlarged inner ends, and a single connecting member adapted to fit into said slots.

5. The described device consisting of a pair of rails having tongue and groove connections, sliding joint members connecting said rails, a chair adapted to fit the base of said rails and adapted to slide into position to connect the ends thereof, said chair adapted to receive the lower ends of said joint members, recesses formed in said chair to receive said lower ends, said rails having slots with enlarged inner ends, and a single connecting member adapted to fit into said slots, said member being shorter than the combined length of said slots whereby expansion and contraction of said rails will be accommodated.

6. The described device consisting of a pair of rails, a chair adapted to fit the base of said rails, sliding joint members connecting said rails, said chair adapted to receive the lower ends of said joint members, recesses formed in said chair to receive said members, said joint members having bifurcated upper ends, and slots in the treads to receive said ends.

In testimony whereof I affix my signature in presence of two witnesses.

MOSES McCORMICK SHAW.

Witnesses:
ROBERT F. GIBSON,
J. L. COURTNEY.

Copies of this patent may be obtained for five cents each, by addressing the "Commissioner of Patents, Washington, D. C."